(12) United States Patent
Kawamura et al.

(10) Patent No.: US 10,432,339 B2
(45) Date of Patent: Oct. 1, 2019

(54) PROCESS OF ASSEMBLING OPTICAL RECEIVER MODULE

(71) Applicant: SUMITOMO ELECTRIC INDUSTRIES, LTD., Osaka-shi (JP)

(72) Inventors: Masanobu Kawamura, Osaka (JP); Hiroshi Hara, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/150,332

(22) Filed: Oct. 3, 2018

(65) Prior Publication Data
US 2019/0103936 A1    Apr. 4, 2019

(30) Foreign Application Priority Data
Oct. 3, 2017   (JP) ................................ 2017-193766

(51) Int. Cl.
*H04J 14/02*    (2006.01)
*H04B 10/67*    (2013.01)

(52) U.S. Cl.
CPC ........ *H04J 14/0215* (2013.01); *H04B 10/675* (2013.01); *H04J 14/0261* (2013.01)

(58) Field of Classification Search
CPC .... H04B 10/675; H04B 10/67; H04B 10/506; H04B 10/691; H04J 14/02; H04J 14/0215; H04J 14/0261; G02B 6/29367; G02B 6/2938; G02B 6/4214; G02B 6/4215; G02B 6/29389; G02B 2006/12107; G02B 6/3512; G02B 2006/12109; G02B 2006/12114; G02B 2006/12164; G02B 6/3534; G02B 6/12007; G02B 2006/12104; G02B 27/1006; G02B 5/045; G02B 6/34; G02F 2201/30; G02F 2201/34; H04Q 2011/0009

USPC ............ 398/79, 85, 86, 87, 168–171, 84, 88
See application file for complete search history.

(56) References Cited

U.S. PATENT DOCUMENTS

| 6,625,344 | B2 * | 9/2003 | Liao ....................... G02B 6/352 385/16 |
| 6,636,658 | B2 * | 10/2003 | Goodman ............ G02B 6/2713 385/24 |
| 6,856,435 | B2 * | 2/2005 | Richard ................. G01B 11/27 359/589 |

(Continued)

FOREIGN PATENT DOCUMENTS

| JP | 2009-198958 A | 9/2009 |
| JP | 2009198576 A | * 9/2009 |

*Primary Examiner* — Hibret A Woldekidan
(74) *Attorney, Agent, or Firm* — Baker Botts L.L.P.; Michael A. Sartori

(57) ABSTRACT

A process of assembling an optical receiver module that receives a wavelength multiplexed signal is disclosed. The process includes a step of sequentially mounting a wavelength selective filter (WSF), a prism, a mirror, and first and second optical de-multiplexers (o-DeMuxes) each on the carrier. The WSF transmits a first wavelength multiplexed signal but reflects a second wavelength multiplexed signal. The prism includes first and second surfaces, where the first surface reflects the wavelength multiplexed signal toward the WSF, while the second surface receives a second wavelength multiplexed signal coming from the WSF. The mirror reflects the first wavelength multiplexed signal transmitting through the WSF. The first and second o-DeMuxes de-multiplex the first and second wavelength multiplexed signals.

8 Claims, 12 Drawing Sheets

(56) References Cited

U.S. PATENT DOCUMENTS

| | | | |
|---|---|---|---|
| 7,639,906 B1 * | 12/2009 | Strasser | G02B 6/2706 |
| | | | 385/24 |
| 7,912,374 B1 * | 3/2011 | Wang | G02B 3/0087 |
| | | | 359/634 |
| 9,197,345 B2 * | 11/2015 | Nakajima | H04J 14/02 |
| 9,363,021 B2 * | 6/2016 | Fujimura | G01J 1/44 |
| 9,971,113 B2 * | 5/2018 | Hara | G02B 6/4214 |
| 10,090,934 B2 * | 10/2018 | Hara | H04B 10/66 |
| 2005/0244097 A1 * | 11/2005 | Kagami | G02B 6/3508 |
| | | | 385/16 |
| 2013/0148970 A1 | 6/2013 | Nakajima et al. | |
| 2014/0133862 A1 * | 5/2014 | Fujimura | G02B 6/4215 |
| | | | 398/79 |
| 2014/0346323 A1 | 11/2014 | Fujimura et al. | |
| 2015/0365175 A1 | 12/2015 | Kawamura et al. | |
| 2015/0365176 A1 | 12/2015 | Kawamura et al. | |
| 2016/0170145 A1 | 6/2016 | Kawamura et al. | |
| 2017/0134099 A1 * | 5/2017 | Hara | H04B 10/66 |
| 2019/0109650 A1 * | 4/2019 | Mii | H04B 10/691 |

* cited by examiner

PROCESS OF ASSEMBLING OPTICAL RECEIVER MODULE

CROSS REFERENCE TO RELATED APPLICATION

The present application is based on and claims benefit of priority of Japanese Patent Application No. 2017493766, filed on Oct. 3, 2017, the entire content of which is incorporated herein by reference.

BACKGROUND OF THE INVENTION

1. Field of Invention

The present invention relates to a process of assembling an optical receiver module, in particular, relates to an optical receiver module that receives a wavelength multiplexed signal multiplexing a plurality of optical signals and generate electrical signals each corresponding to the optical signals.

2. Background Arts

An advanced optical communication system has requested in optical modules implemented therein to be operable faster and faster. The transmission speed of such an optical communication system reaches 40 Gbps and sometimes exceeds 100 Gbps. One solution for such an extremely high speed communication system is a wavelength division multiplexing (WDM) configuration. When an optical transceiver installs two or more optical modules each responding only one wavelength, such an optical transceiver inevitably enlarges physical dimensions thereof. An optical module implementing two or more semiconductor optical devices corresponding to optical signals and electrical circuits within a housing has been requested in the field in order to save a footprint of an optical transceiver.

A Japanese Patent Application laid open No. JP2009-198958A has disclosed an optical module applicable to the WDM system. The optical module disclosed therein provides a wavelength selective filter (WSF) that divides eight (8) optical signals multiplexed in a wavelength multiplexed signal into two portions, one of which multiplexes the optical signals with longer four wavelengths, while another portion multiplexes the rest optical signals with shorter four wavelengths. These two wavelength multiplexed signals are de-multiplexed by optical de-multiplexers (o-DeMuxes) each apart from the WSF by distances equal to each other. However, the WSF is disposed such that the incident surface thereof makes a half right angle (45°) against the optical axis of the wavelength multiplexed signal.

The wavelength selective function of a WSF strongly depends on the incident angle. Performances or specifications of the WSF are those measured at the incident angle of 0°, and degrades as the incident angle becomes larger. In order to maintain the wavelength selective function of the WSF, a number of layers constituting the filter is necessary to be increased. But the increased number of the multi-layered filter inevitably lowers transmittance thereof.

For instance, in order to satisfy the specification defined in the coarse wavelength division multiplexing (CWDM) system, the incident angle of the WSF is necessary to be smaller than 20°, preferably smaller than 15° to securely discriminate optical signals. A greater incident angle for the WSF, the WSF possibly mixes an optical signal belonging in a neighbor channel.

Also, an optical coupling system is hard to be regarded to process an optical beam output from a point source. Even when the optical signal is processed by a collimating lens, the optical signal passing the collimating lens is never converted into a true collimated beam but becomes a quasi-collimated beam that forms a beam waist and diverges apart from the beam waist. When the de-multiplexed optical signals have optical paths different from each other, coupling efficiencies of the optical signals at optical detectors scatters depending on the optical paths.

SUMMARY OF INVENTION

An aspect of the present invention relates to a process of assembling an optical receiver module receiving a wavelength multiplexed signal that multiplexes optical signals attributed to wavelengths different from each other and generates electrical signals corresponding to the optical signals. The process includes steps of: mounting a wavelength selective filter (WSF), a prism, a mirror, and first and second optical de-multiplexers (o-DeMuxes) sequentially on a carrier. The WSF transmits a first wavelength multiplexed signal that multiplexes a portion of the optical signals and reflects a second wavelength multiplexed signal that multiplexes rests of the optical signals. The prism includes a first surface and a second surface, where the first surface reflects the wavelength multiplexed signal toward the WSF but the second surface receives the second wavelength multiplexed reflected by the WSF. The mirror reflects the first wavelength multiplexed signal transmitting through the WSF. The first and second o-DeMuxes de-multiplex the first wavelength multiplexed signal coming from the mirror and the second wavelength multiplexed signal coming from the second surface of the prism, respectively.

DESCRIPTION OF EMBODIMENT

Next, embodiment according to the present invention will be described as referring to accompanying drawings. The present invention, however, is not restricted to the embodiment and has a scope defined in claims attached and all changes and modifications within the scope and equivalents thereto. In the description of the drawings, numerals or symbols same with or similar to each other will refer to elements same with or similar to each other without duplicating explanations.

Figure 1:
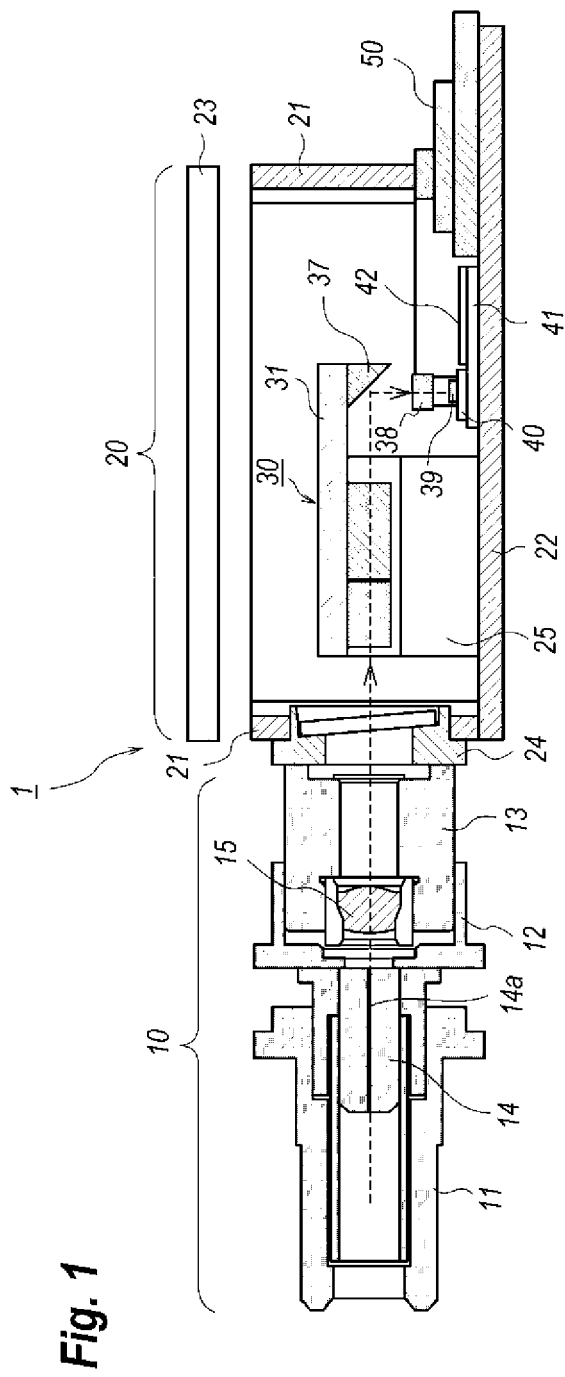
FIG. 1 is a cross sectional view of an optical receiver module built by an assembling process according to the present invention.

FIG. 1 is a cross sectional view showing an optical receiver module 1 assembled by a process according to the present invention. The optical receiver module 1 receives a wavelength multiplexed signal that multiplexes a plurality of optical signals having wavelengths different from each other, where the wavelength multiplexed signal has eight (8) optical signals each having wavelengths of $\lambda_1$ to $\lambda_8$. The optical receiver module 1 may generate electrical signals converted from the optical signals multiplexed in the wavelength multiplexed signal. Referring to FIG. 1, the optical receiver module 1 includes a coupling portion 10 optically coupled with an external optical fiber with a single mode configuration, a housing 20 that encloses semiconductor optical elements, and a terminal 50, where the coupling portion 10 is provided in a front of the housing 20, while, the terminal 50 is provided in a rear thereof. The description below assumes a direction of "front" and/or "forward" is a side where the optical coupling portion 10 is provided, while, another direction of "rear" and/or "back" is assumed to be another side where the terminal 50 is provided with respect to the housing 20. However, those directions are only for explanation sake, and could not affect the scope of the present invention.

The coupling portion 10 includes a sleeve 11, a joint sleeve 12, and a lens holder 13, where the sleeve 11 receives a ferrule secured in a tip of the external optical connector, the lens holder 13 attaches the coupling portion 10 to the housing 20, and the joint sleeve 12 mechanically couples the sleeve 11 with the lens holder 13.

The housing 20, which has a box shape, includes a frame 21 having a rectangular planar cross section and constituting sides walls of the housing 20, a bottom 22, and a lid 23, where the frame 21, the bottom 22, and the lid 23 form a space within which optical and electrical components are enclosed. The front wall of the frame 21 provides a bush 24 with a disk shape. The bush 24 provides a planar front surface that becomes a reference surface for aligning optical components. The bottom 22 may be made of sintered metals of copper molybdenum (CuMo), copper tungsten (CuW), and so on. The bottom 22 made of metal; specifically, metal with good thermal conductivity may enhance heat dissipating function from the components in the space to an outside of the housing 20. The lid 23 is fixed to the frame 21 air-tightly, that is, the lid 23 may seal the space hermetically.

The terminal 50, which may be made of multi-layered ceramics, is assembled in the rear of the housing 20 so as to be buried within the rear wall. The terminal 50 provides signal lines and bias lines that electrically couple the components enclosed within the housing 20 with external apparatuses.

The lens holder 13 in the coupling portion 10 is fixed to the housing 20 through the bush 24; while, fixes the sleeve 11 thereto through the joint sleeve 12. The joint sleeve 12 may optically align the sleeve 11 with the optical components enclosed within the housing 20 along an axis of the coupling portion 10 and within a plane perpendicular to the axis. The sleeve 11 secures a stub 14 in one end thereof; while, receives the ferrule secured in the external optical connector in another end. The stub 14 includes a coupling fiber 14a in a center thereof. Inserting the ferrule into the sleeve 11 and abutting the ferrule against the stub 14, which may constitute the physical contact between two fibers, the external optical fiber and the coupling fiber 14a; the external optical fiber secured in the ferrule may optically couple with the optical component installed within the housing 20. The lens holder 13 secures a first lens 15 therein, where the first lens 15 may convert the wavelength multiplexed signal output from the coupling fiber 14a into a quasi-collimated beam. The wavelength multiplexed signal converted into the quasi-collimated beam enters within the housing 20 through a window set in the bush 24.

The first lens 15 is aligned in a position thereof such that a distance to the end of the coupling fiber 14a from the first lens 15 substantially equal to a focal length of the first lens 15. This arrangement of the first lens 15 may convert the wavelength multiplexed signal output from the coupling fiber 14a into the quasi-collimated beam. Because the end of the coupling fiber 14a may be not regarded as a pint source, an optical beam output from the first lens 15 forms a beam waist. In spite of the function of the first lens 15 thus described, the present embodiment disposed the first lens 15 in a position where the distance to the end of the coupling fiber 14a from the first lens 15 is slightly greater than the focal length of the first lens 15. Accordingly, the wavelength multiplexed signal output from the first lens 15 becomes a concentrated beam. Details of the disposition of the first lens 15, including the function thereof, will be described in detail later.

The optical receiver module 1 of the present embodiment installs an optical de-multiplexing assembly 30 on a carrier 31, within the housing 20, where the optical de-multiplexing assembly 30 de-multiplexes the optical multiplexed signal into respective optical signals. The carrier 31 is supported by a support 25 such that a back surface thereof onto which optical components are mounted faces the bottom 22 but apart therefrom. The optical signals de-multiplexed by the optical de-multiplexing assembly 30 enter an arrayed photodiodes (PD) 39 bent downward to the bottom 22 and concentrated by an arrayed lens 38, where the arrayed lens 38 and the arrayed PD 39 are mounted on the bottom 22 through a first and second sub-mounts, 40 and 41, respectively.

The optical receiver module 1 thus configured has a feature that the optical components constituting the optical de-multiplexing assembly 30 are mounted on the back surface of the carrier 31 that is supported by the support 25 apart from and parallel to the bottom 22 so as to leave a space under the carrier 31, while, the arrayed lens 38 and the arrayed PD 39 are stacked on the bottom 22 within the space under the carrier 25. This arrangement of the optical de-multiplexing assembly 30, the arrayed lens 38, and the arrayed PD 39 may save a footprint of the bottom 22 to leave an area for installing circuits of trans-impedance amplifiers that amplify electrical signals output from the arrayed PD 39.

Figure 2:
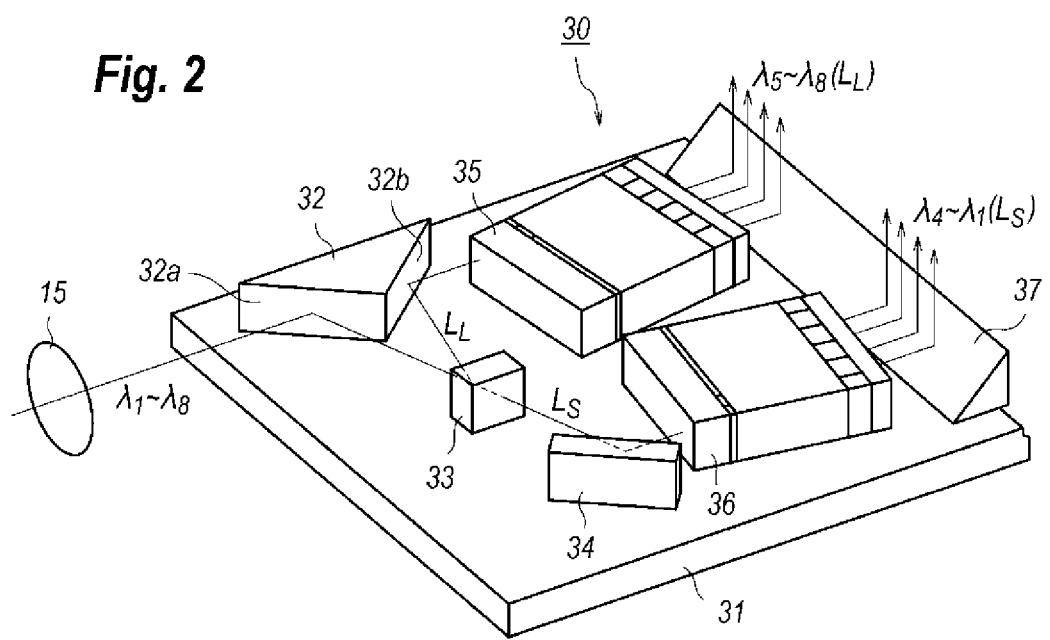
FIG. 2 is a perspective view showing an optical de-multiplexing assembly implemented within the optical receiver module shown in FIG. 1.
Figure 3:
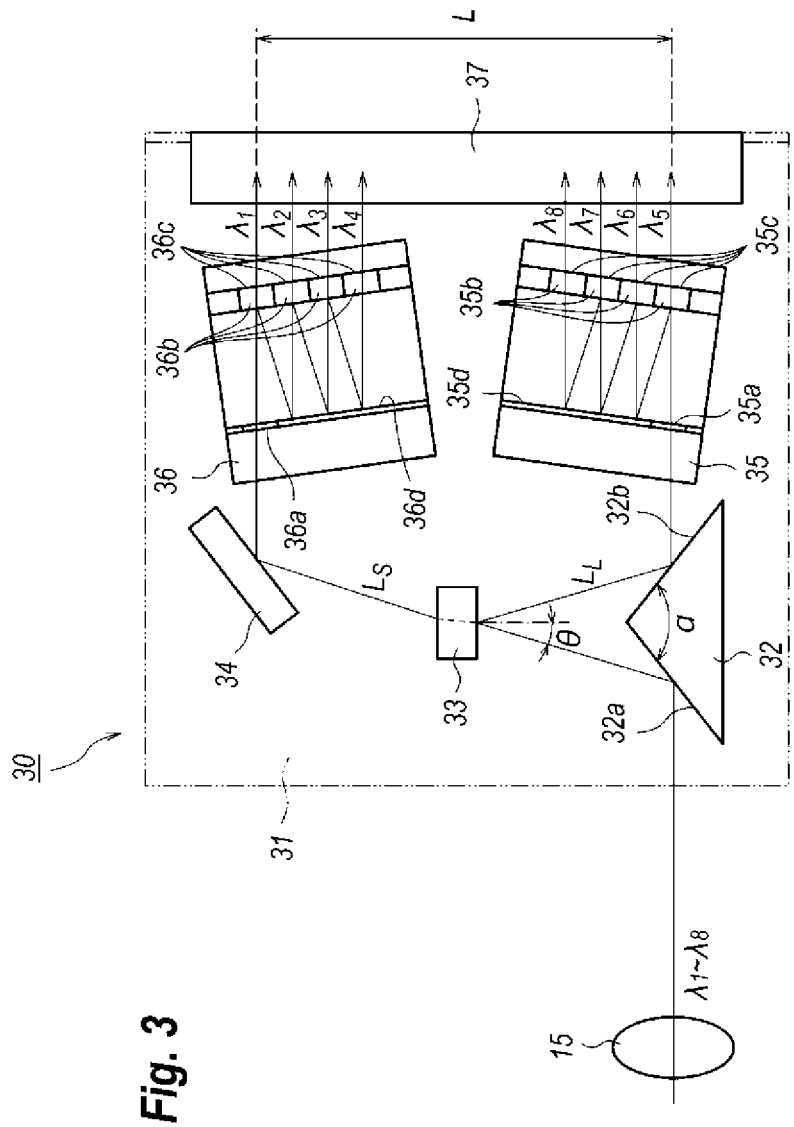
FIG. 3 is a top view of the optical de-multiplexing assembly.

Next, the optical de-multiplexing assembly 30 will be described in detail, in particular, functions thereof will be explained. FIG. 2 is a perspective view showing the optical de-multiplexing assembly 30 mounted on the carrier 31, and FIG. 3 is a plane view thereof. The optically multiplexed signal subject to the optical receiver module 1 of the present embodiment multiplexes eight optical signals.

The optical de-multiplexing assembly 30 includes on the carrier 31, a prism 32, which may be regarded as a first mirror, a wavelength selective filter (WSF) 33, a reflector 34, which may be regarded as a second mirror, a first optical de-multiplexer (o-DeMux) 35, a second o-DeMux 36, and another reflector 37, which may be regarded as a third reflector. A feature of the optical de-multiplexing assemble 30 of the present embodiment is that a distance of an optical path from the first lens 15 in the coupling portion 10 to an input port of the first o-DeMux 35 is substantially equal to a distance of another optical path from the first lens 15 to an input port of the second o-DeMux 36.

The prism 32 has a plane shape of an isosceles triangle with a vertex angle α greater than 90° and a first face 32a that is one of equal sides of the isosceles triangle reflects the quasi collimated beam coming from the first lens 15 toward the WSF 33. The WSF 33 transmits a portion of the wavelength multiplexed signal that multiplexes the optical signals with shorter four wavelengths, $\lambda_1$ to $\lambda_4$; while, reflects another portion of the wavelength multiplexed signal that multiplexes the other optical signals having longer four wavelengths, $\lambda_5$ to $\lambda_8$. The prism 32 and the WSF 33 are disposed on the carrier 31 such that a base of the isosceles triangle facing the vertex with the angle α of the prism 32 and an input surface of the WSF 32 become substantially parallel to an optical axis of the first lens 15. Also, the vertex angle α of the prism 32 may be set such that the quasi collimate beam reflected at the first face 32a of the prism 32 makes an incident angle for the WSF 33 that is smaller than 20°, or preferable smaller than 15° to show wavelength discriminating performance of the WSF 33. That is, the WSF 33 stably divides the wavelength multiplexed signal $L_S$ with the shorter four wavelengths, $\lambda_1$ to $\lambda_4$, from the other wavelength multiplexed signal $L_L$ with the longer four wavelengths, $\lambda_5$ to $\lambda_8$.

The optical signals, which may be collectively denoted by a symbol LS, with the shorter four wavelengths, $\lambda_1$ to $\lambda_4$, are bent by the second mirror 34 for an optical axis thereof to become parallel to that of the first lens 15, then enter into the second o-DeMux 36. While, the optical signals, which may be collectively denoted by another symbol $L_L$, with the longer wavelengths, $\lambda_5$ to $\lambda_8$, enter a second face 32b of the prism 32 reflected by the WSF 33, where the second face 32b is the other of the equal sides of the isosceles triangle. The optical signals $L_L$ with the longer four wavelengths, $\lambda_5$ to $\lambda_8$, is reflected thereat such that the optical axis thereof becomes parallel to the optical axis of the first lens 15, and enters the first o-DeMux 35.

Also, moving the second mirror 34 laterally with respect to the optical axis of the first lens 15, namely, perpendicular to the optical axis thereof, keeping the optical signals $L_S$ with the shorter four wavelengths, $\lambda_1$~$\lambda_4$, entering the second o-DeMux 36 in the optical axis thereof parallel to the optical axis of the other optical signals $L_L$ with the longer four wavelengths, $\lambda_5$~$\lambda_8$, entering the first o-DeMux 35, an optical distance from the reflecting surface of the WSF 33 to the input port of the first o-DeMux 35 may be adjusted. This means, the assembling process according to the present invention may set an optical distance from the first lens 15 to the first o-DeMux 35 to be equal to an optical distance from the first lens 15 to the second o-DeMux 36, and alignment of the first lens 15 along the optical axis thereof, that is, adjustment of a distance from the end of the coupling fiber 14a to the first lens 15 may equally affect the optical distances from the first lens 15 to the respective o-DeMuxes, 35 and 36.

The first o-DeMux 35 integrates an input port 35a, wavelength selective filters WSFs 35b, whose number depends on the multiplicity of the optical signals, an output port 35c, and a reflecting film 35d. Similarly, the other o-DeMux 36 integrates the input port 36a, the WSFs 36b, the output port 36c, and the reflecting film 36d. The present embodiment disposes those o-DeMuxes, 35 and 36, such that the respective input ports, 35a and 36a, are set outermost on the carrier 31 but slightly turn inward; that is, the optical axes of the input ports, 35a and 36a, are slightly inclined with respect to the optical axes of the respective optical signals, $L_S$ and $L_L$, entering the o-DeMuxes, 35 and 36.

The WSF 36b in the second o-DeMux 36 may extract the optical signal with the first wavelength $\lambda_4$ among the wavelength multiplexed signal $L_S$ with the shorter four wavelengths, $\lambda_1$~$\lambda_4$. Other three optical signals having the wavelengths, $\lambda_2$ to $\lambda_4$, are reflected by the WSF 36b toward the reflecting film 36d that fully reflects those optical signals toward the WSF 36b. The WSF 36b may extract the optical signal with the wavelength $\lambda_2$ to output through the output port 36c but reflects rest two optical signals with the wavelengths, $\lambda_3$ and $\lambda_4$. The second o-DeMux 36 may iterate the operation above and may output the optical signals with the shorter four wavelengths, $\lambda_1$~$\lambda_4$, from the output port 36c but different positions therein.

The optical signals with the wavelengths, $\lambda_1$~$\lambda_4$, output from the output port 36c are reflected by the third mirror 37 provided in the rear end of the carrier 31 toward the arrayed lens 38 and the arrayed PD 39 disposed below the carrier 31. The third mirror 37 may be a type of a prism mirror with a cross section of rectangular equilateral triangle.

For the other wavelength multiplexed signal $L_L$ with the longer four wavelengths, $\lambda_5$~$\lambda_8$, which is reflected by the WSF 33, enters the input port 35a of the first o-DeMux 35. The first o-DeMux 35, same with the second o-DeMux 36 described above, may de-multiplex the wavelength multiplexed signal $L_L$ into four optical signals and output thus de-multiplexed optical signals from the output port 35c but the positions different from each other toward the third mirror 37. The third mirror 37 reflects the optical signals coming from the first o-DeMux 35 toward the arrayed lens 38 and the arrayed PD 39. Referring to FIG. 1, because the arrayed lens 38 and the arrayed PD 39 are stacked under the carrier 31, the optical receiver module 1 of the present embodiment may leave a room to mount electronic circuits 42 there.

In the present embodiment, the WSFs, 35b and 36b, have four types of filters having specific cut-off frequencies different from each other. In order to maintain reliability of the wavelength selective function for the respective filters, the optical signals entering the respective filters are necessary to have field diameter thereof smaller than 300 μm. When the wavelength multiplexed optical signal output from the first lens 15 is a pure collimated beam, the beam diameter is unchanged, or, independent of a distance from the first lens 15. However, a pure collimated beam may be obtained only for an arrangement where the end of the coupling fiber 14a, from which the wavelength multiplexed signal is output, may be regarded as a point source. Practically, the wavelength multiplexed signal output from the first lens 15 is a quasi-collimated beam with a beam waist.

Accordingly, the present optical receiver module 1, in an assembling process thereof, is necessary to adjust a distance from the end of the coupling fiber 14a to the first lens 15 such that the beam waist of the wavelength multiplexed signal output from the first lens 15 locates in a midway of a longest optical path and a shortest optical path from the first lens 15 to the arrayed lens. Specifically, the embodiment sets a distance L from the end of the coupling fiber 14a to the first lens 15 slightly longer than a focal length Lf of the first lens 15.

The embodiment thus described disposes two o-DeMuxes, 35 and 36, such that the input ports thereof, 35a and 36a, are arranged outermost on the carrier 31 and slightly turn inward each other. However, the disposition of the o-DeMuxes, 35 and 36, are not restricted to those arrangements; for instance, two input ports, 35a and 36a, have a same arrangement and turn to a same direction; that is, two o-DeMuxes, 35 and 36, having the same arrangement are disposed side by side. Also, the WSF 33 may transmit the optical signals with the longer four wavelengths, $\lambda_5$ to $\lambda_8$, while reflects the optical signals with the shorter four wavelengths, $\lambda_1$ to $\lambda_4$.

Figure 6:
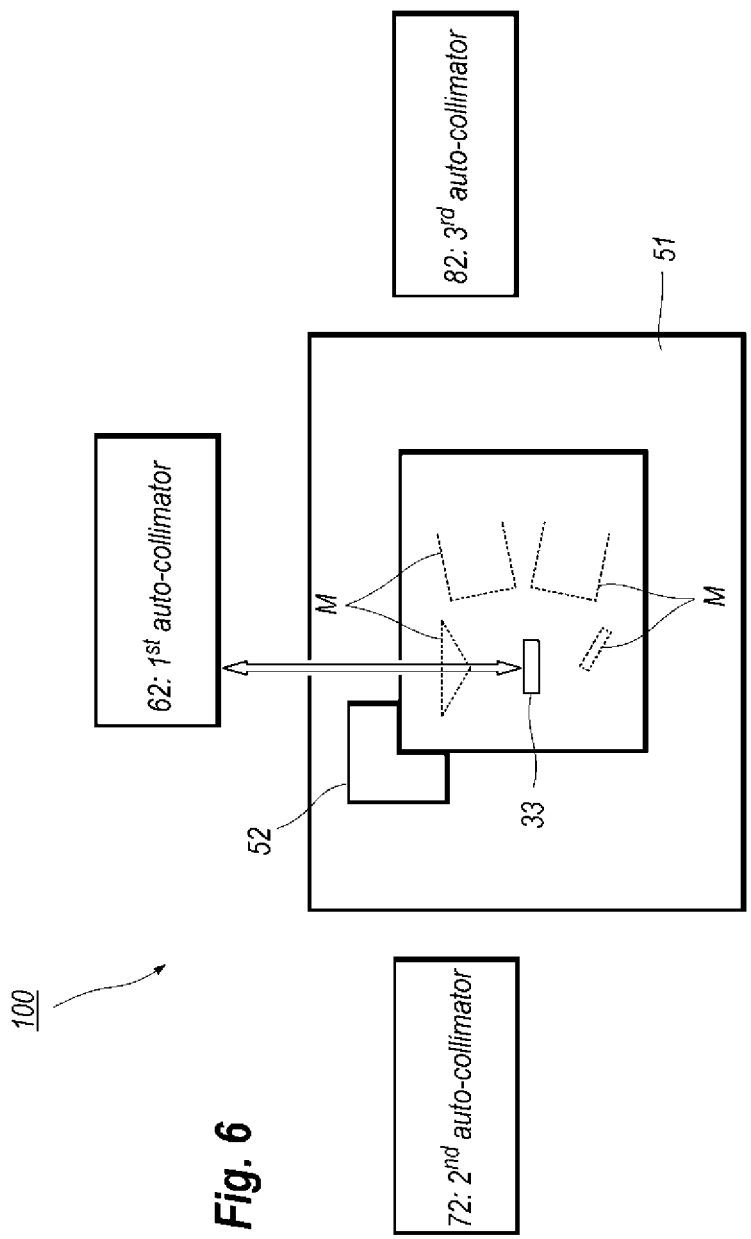
FIG. 6 schematically shows a step of installing a wavelength selective filter on the carrier.
Figure 7:
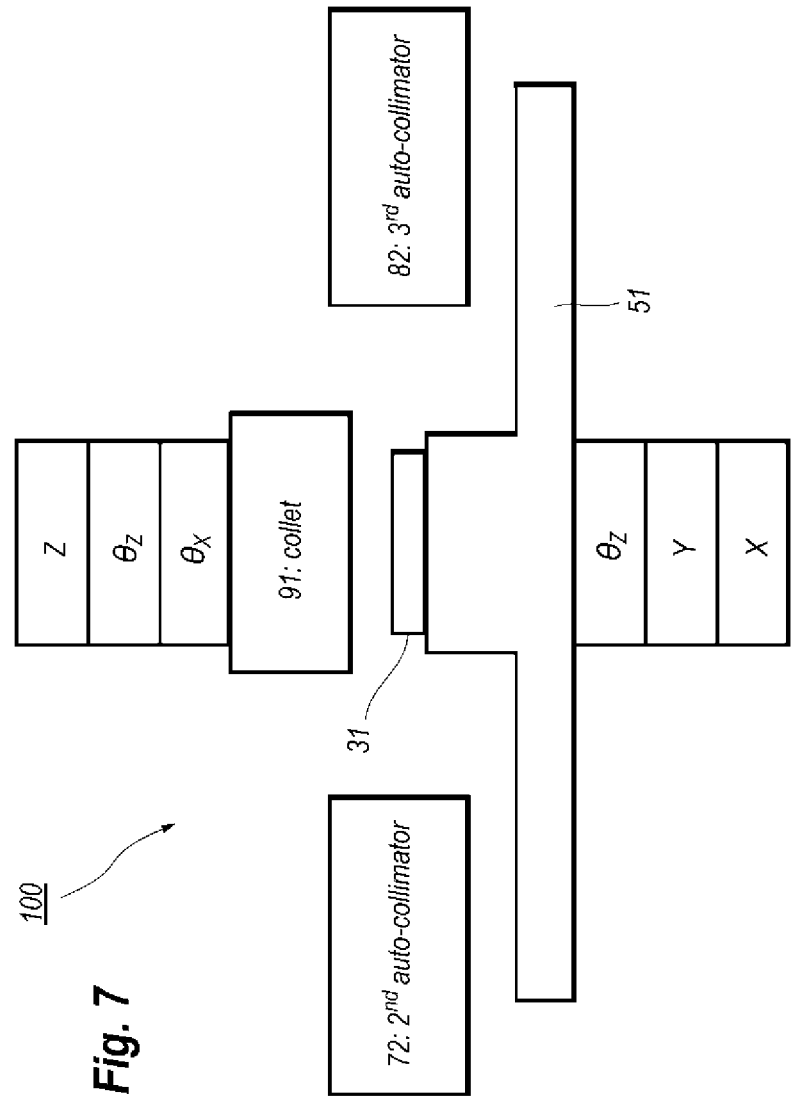
FIG. 7 schematically shows a setup of assembling the wavelength de-multiplexing assembly.
Figure 8:
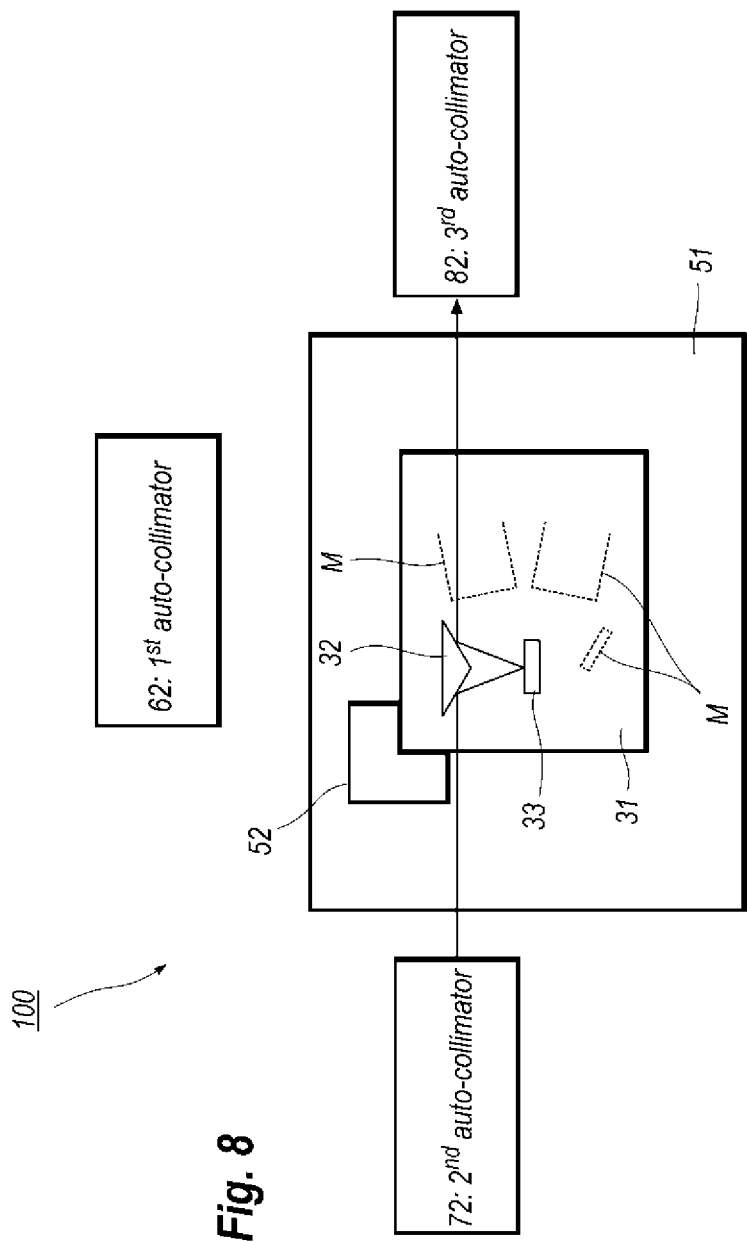
FIG. 8 shows a process of installing a prism.
Figure 9:
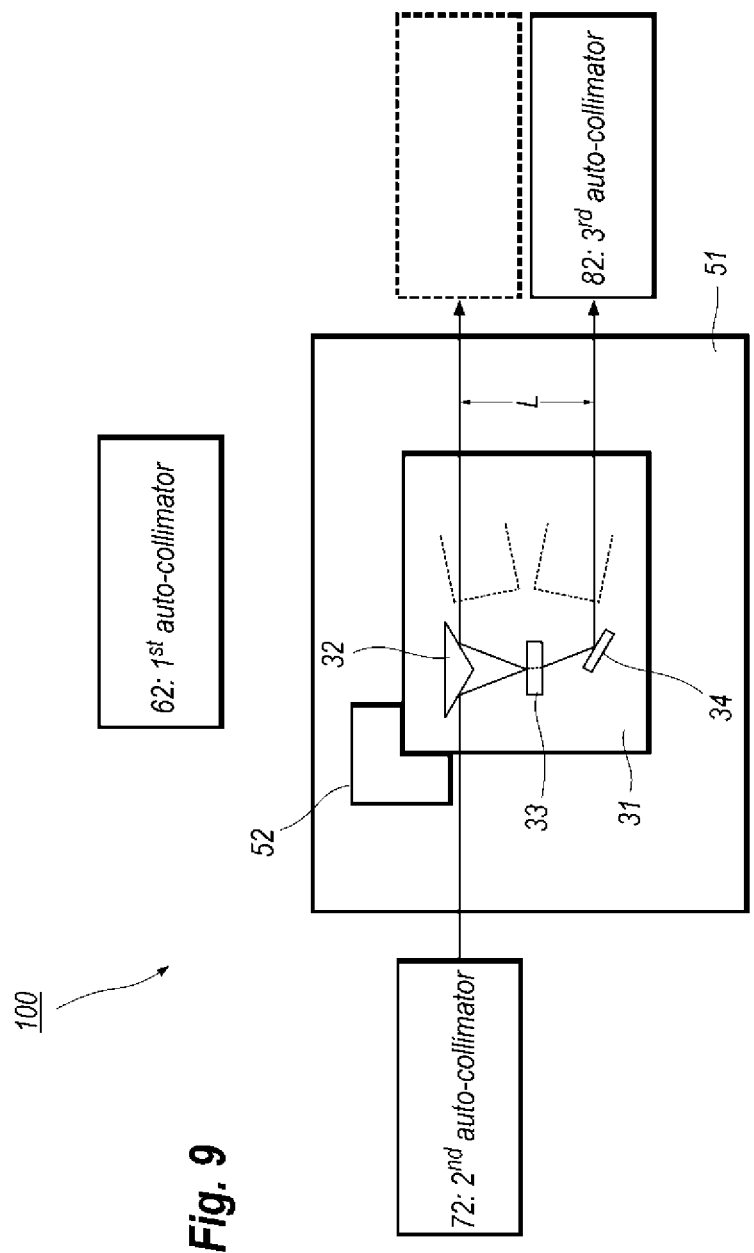
FIG. 9 shows a process of installing a second mirror.
Figure 10:
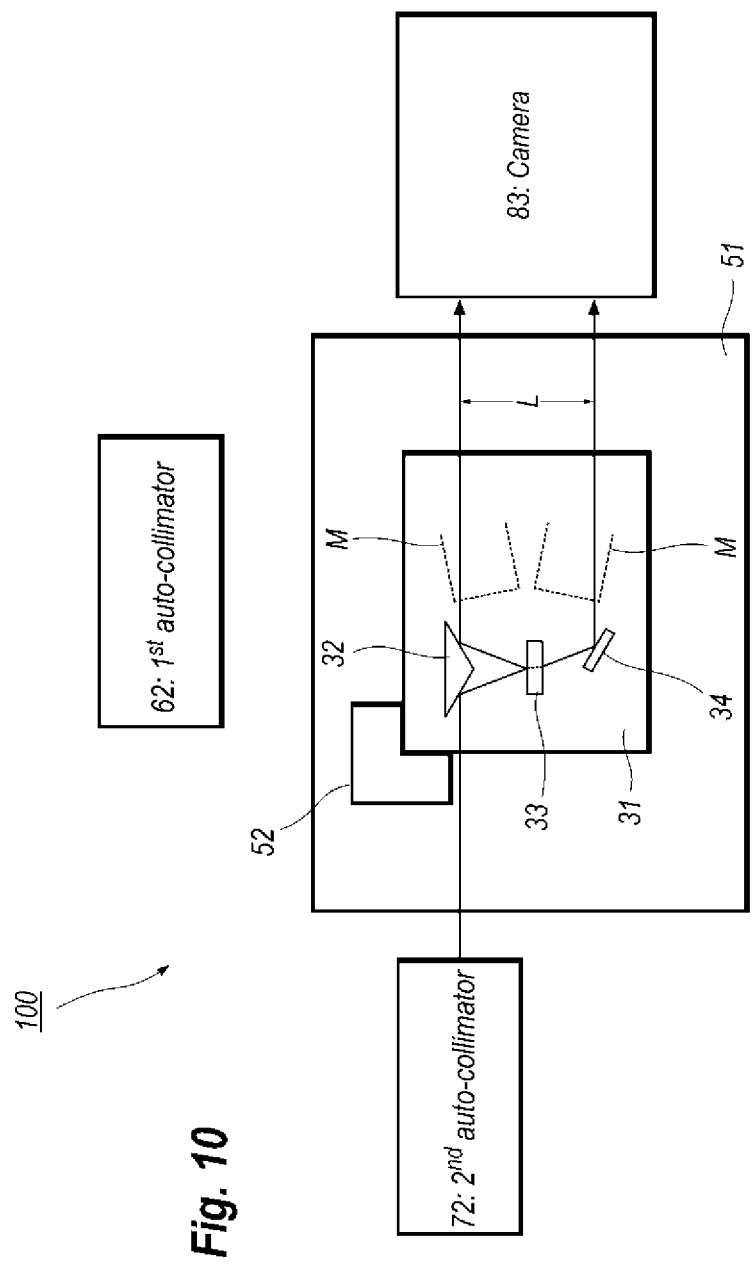
FIG. 10 shows a process of adjusting a position of the second mirror.
Figure 11:
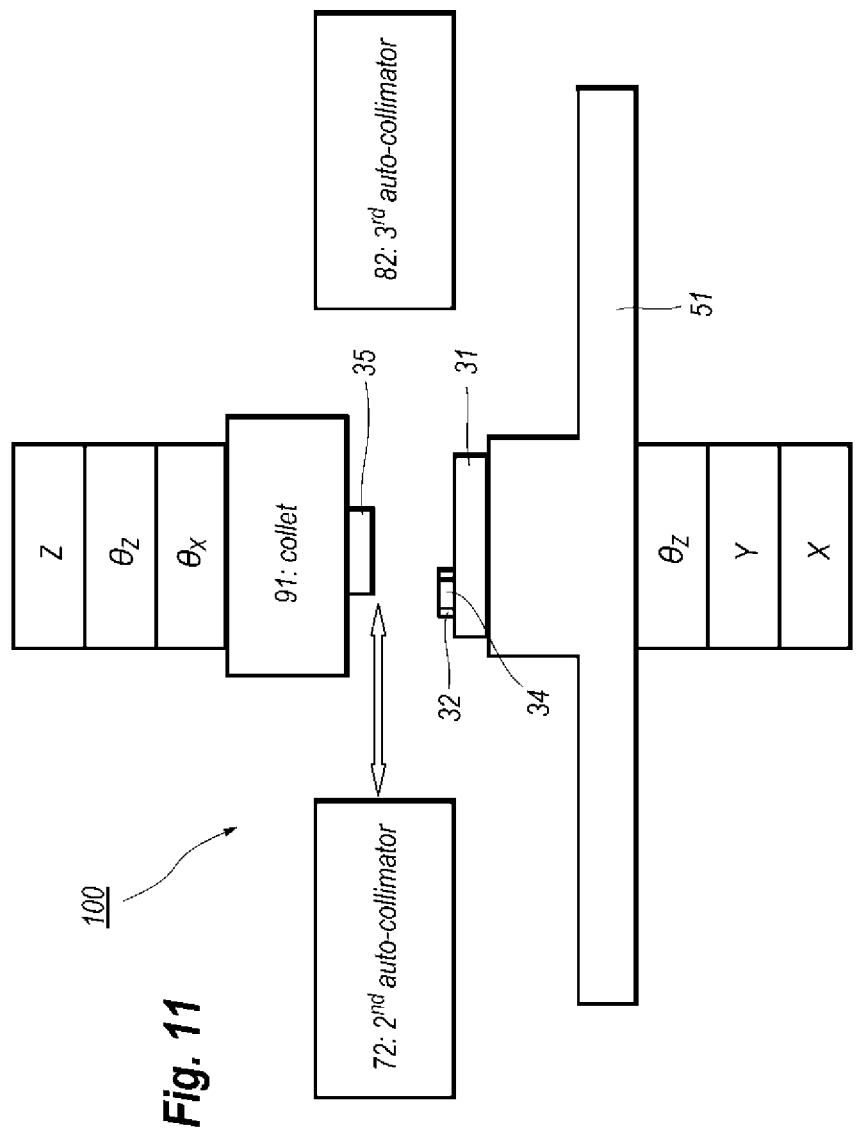
FIG. 11 schematically shows a process of installing optical de-multiplexers.
Figure 12:
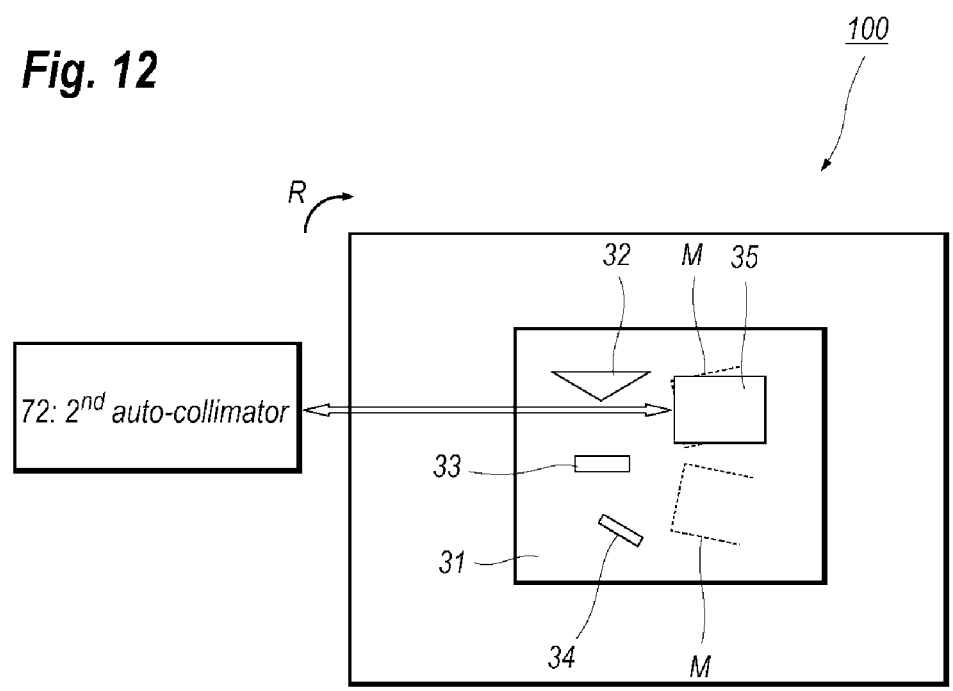
FIG. 12 shows a process of rotating the optical de-multiplexers.

Next, a process of assembling the optical receiver module 1 will be described. FIG. 4 to FIG. 12 show steps of the process of assembling the optical receiver module 1, where FIG. 4 and FIG. 5 correspond to steps of initializing or preparation, FIG. 6 and FIG. 7 show steps of assembling the WSF 33, FIG. 8 shows a step of assembling the prism 32, FIG. 9 and FIG. 10 show steps of assembling the mirror 34, and FIG. 11 and FIG. 12 show steps of assembling the first o-DeMux 35, respectively.

Preparation

Figure 4:
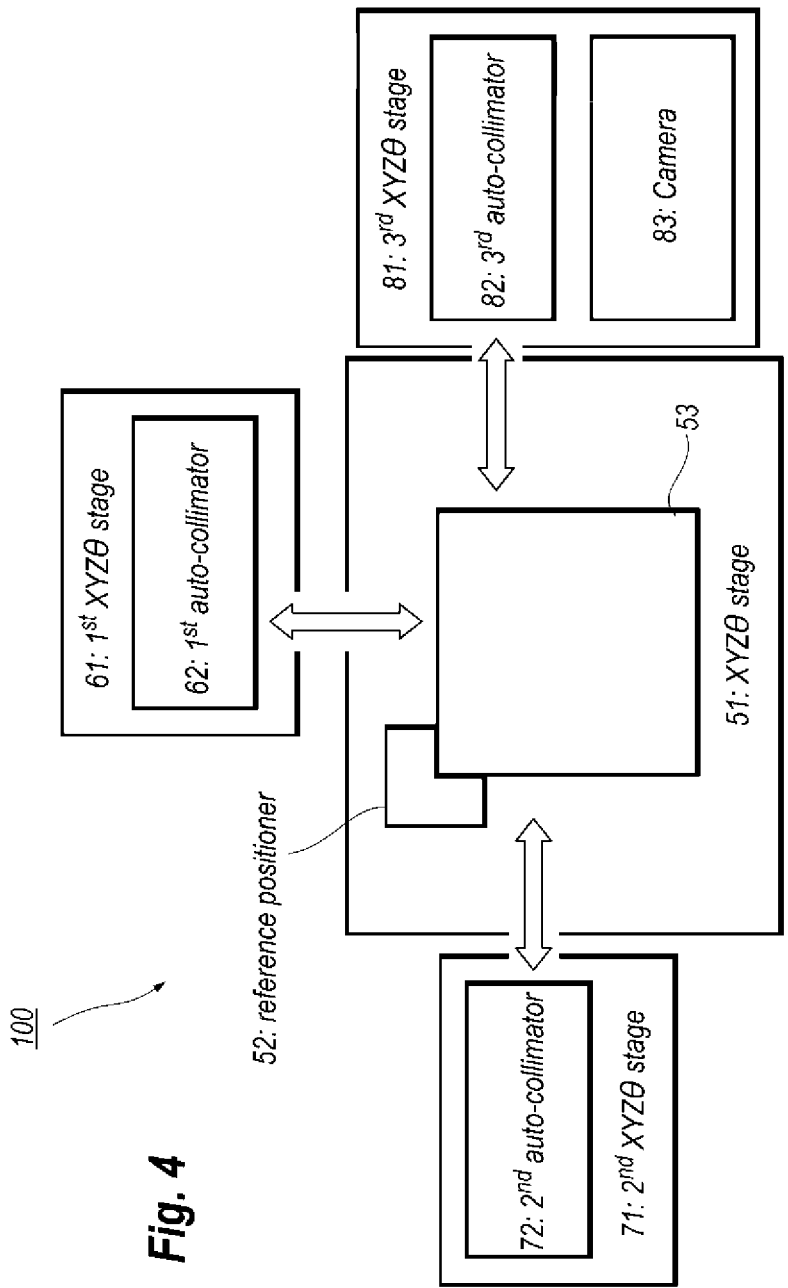
FIG. 4 explains an initial step in the assembling process of the optical receiver module according to embodiment of the present invention.
Figure 5:
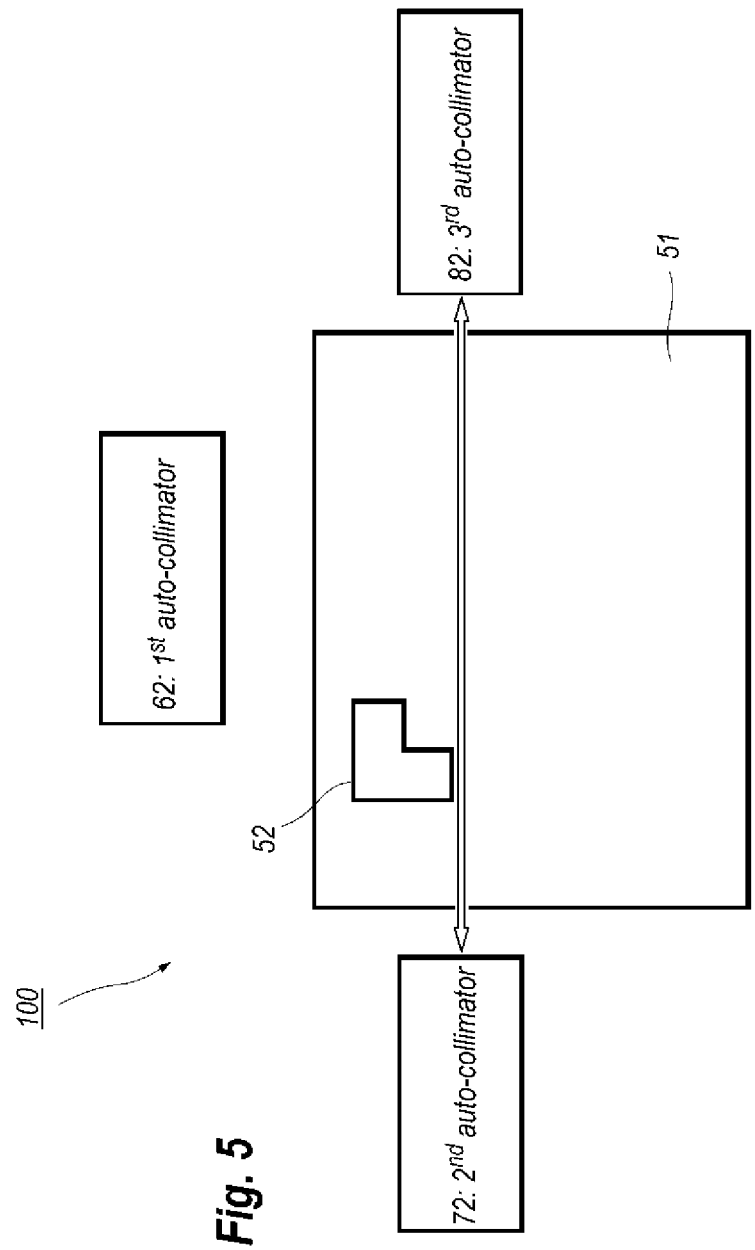
FIG. 5 explains another calibration in the assembling process of the optical receiver module.

An apparatus 100 for assembling the optical de-multiplexing assembly includes a base stage 51, and first to third stages, 61, 71, and 81. The base stage 51 is movable along directions of X, Y, Z; rotatable around Z-axis; and mounts a reference positioner 52 with a plane shape of an L-character to determine a corner position of the carrier 31. The first to third stages, 61, 71, and 81, provide respective auto-collimators, 62, 72, and 82, thereon. The first stage 61 is disposed laterally apart from the base stage 51, as shown in FIG. 4. The second stage 71 that provides the second auto-collimator 72 and the third stage 81 that provides the third auto-collimator 82 and a camera 83 are also disposed apart from the base stage 51 so as to put the base stage 51 therebetween. The apparatus 100 also provides a collet 91 and a driving mechanism therefor, which are explained later.

The assembly process first abuts a reference block 53 with a pure rectangle in one of the corners against a corner of the reference positioner 52 on the base stage 51. The reference block 53 provides reflecting surfaces facing the stages, 61 and 71, where the reflecting surfaces make an exact right angle with respect to each other. The process then adjusts respective adjustable axes of X, Y, Z, and θ of the stages, 61 and 71, such that the auto-collimators, 62 and 72, mounted on the stages, 61 and 71, in optical axes thereof make a right angle with respect to the reflecting surfaces of the reference block 53.

Thereafter, detaching the reference block 53 from the base stage 51, the process adjusts respective adjustable axes, X, Y, Z, and θ of the third stage 81 such that the test beam output from the third auto-collimator 82 becomes parallel to the test beam output from the second auto-collimator 72. In advance to the adjustment of the third stage 81, the camera 83 is disposed on the third stage 81 such that the optical axis thereof becomes parallel to the optical axis of the third auto-collimator 82. Thus, the initial process of the embodiment may dispose three auto-collimators, 62 to 82, in respective positions as setting the optical axis of the first auto-collimator 62 in perpendicular to the optical axes of the second and third auto-collimators, 72 and 82.

Assembly of Wavelength Selective Filter

Thereafter, the process sets the carrier 31 on the base stage 51, as shown in FIG. 6. The carrier 31, which may be made of ceramics, such as alumina ($Al_2O_3$), provides a primary surface with a rectangular plane shape on which optical components to be mounted. The primary surface may provide indices M that indicate positions of the optical components and may be applied with adhesive type of ultraviolet curable resin on positions indicated by the indices M, or, the optical components are applied with ultraviolet curable resin in surfaces facing to and to be in contact with the primary surface of the carrier 31 in advance to be practically mounted on the carrier 31.

The carrier 31 is mounted on the base stage 51 such that the corner of the carrier 31 closer to the prism 32 set within the corner of the reference positioner 52. Thus, four edges of the carrier 31 become parallel and/or perpendicular to the two edges of the reference positioner 52 forming the corner thereof. Then, picking up the WSF 33 with a vacuum collet 91 and conveying the picked WSF 33 to a position above the index M for the WSF 33, the WSF 33 is lightly abutted against the carrier 31. Then, the WSF 33 in an incident surface thereof may be aligned so as to be perpendicular to the optical axis of the first auto-collimator 62. The WSF 33 in the incident surface thereof may be formed parallel to an output surface thereof. After the alignment, ultraviolet rays may cure the ultraviolet curable resin applied between the carrier 31 and the WSF 33 to fix the WSF 33 onto the carrier 31.

Assembly of Prism

Thereafter, the prism 32 is assembled on the carrier 31. First, similar to the aforementioned step for mounting the WSF 33, picking up the prism 32 with the collet 91 and moving the picked prism 32 to a position above the index M for the prism 32 on the carrier 31, the prism 32 is lightly butted against the carrier 31. Then, as shown in FIG. 8, using test beam coming from the second auto-collimator 72, where the test beam has a wavelength able to be reflected by the WSF 33, the prism 32 is aligned such that the test beam coming from the second auto-collimator 72 becomes parallel to the test beam coming from the third auto-collimator 82. The test beam coming from the second auto-collimator 72 enters the third auto-collimator 82 after being reflected twice by the prism 32 and once by the WSF 33. The prism 32 has the vertex angle α and the incident angle θ of the WSF 33 are determined such that the beam output from the second surface 32b becomes parallel to the beam input to the first surface 32a. After the alignment of the prism 32, the ultraviolet rays may fix the prism 32 by curing the ultraviolet curable resin applied between the prism 32 and the carrier 31. Thereafter, the collet 91 detaches the prism 32. After the alignment, the base of the isosceles triangle counter to the vertex becomes parallel to the optical axis of the beam entering the first surface 32a and that of the beam outgoing from the second surface 32b.

Assembly of Second Mirror

Thereafter, the process assembles the second mirror 34 on the carrier 31. Picking the second mirror 34 with the collet 91 and carrying the second mirror 34 at a position above the index M for the second mirror 34, the second mirror 34 is lightly butted against the carrier 31. As shown in FIG. 9, the second mirror 34 may be adjusted such that the test beam reflected by the second mirror 34, where the test beam has a wavelength able to transmit the WSF 33, becomes parallel to the test beam coming from the third auto-collimator 82. In the present step, the third auto-collimator 82 is moved to a position where the third auto-collimator 82 may detect the test beam originated to the second auto-collimator 72.

Thereafter, using the camera 83, which may be a type of CCD (charge coupled device) camera, the process may adjust a distance between two optical paths, one of which is for the test beam reflected by the WSF 33, while, the other is for that transmitted through the WSF 33. As shown in FIG.

10, the second mirror 34 is shifted along a direction perpendicular to the optical axis of the test beam coming from the second auto-collimator 72 as keeping an angle thereof such that the distance L between two optical axis, one is that for the test beam reflected by the WSF 33, while, the other is for the test beam transmitted through the WSF 33. Setting the distance L in the designed distance, the ultraviolet rays may cure the resin applied between the second mirror 34 and the carrier 31 to fix the second mirror 34 on the carrier 31.

Mounting o-DeMuxes on the Carrier

Thereafter, the process mounts the o-DeMuxes, 35 and 36, onto the carrier 31. Specifically, conveying the first o-DeMux 35 picked with the collet 91 to a position above the index M; then driving mechanism for the collet 91 adjusts a position of the first o-DeMux 35 such that the input port 35a thereof becomes perpendicular to the test beam of the second auto-collimator 72. This positional adjustment of the first o-DeMux 35 may be carried out above the carrier 31 or in an attitude where the first o-DeMux 35 is lightly butted against the carrier 31.

Thereafter, the process rotates the base stage 51 clockwise R as keeping the right angle of the input port 35a of the first o-DeMux 35 against the optical axis of the test beam coming from the second auto-collimator, as shown in FIG. 12. Curing the ultraviolet curable resin applied between the first o-DeMux 35 and the carrier 31, the first o-DeMux 35 is fixed to the carrier 31. The assembly of the second o-DeMux 36 may be carried out by steps substantially equal to the step thus described for the first o-DeMux 35.

Assembly of Third Mirror

The process next fixes the third mirror 37 onto the carrier 31. Specifically, the collet 91 picks up the third mirror 37, conveys in a position above the index M on the carrier 31, and lightly butts the third mirror 37 against the carrier 31. Because the third mirror 37 is the prism having the cross section of a rectangular equilateral triangle; one of surfaces forming the vertex of the right angle faces and is fixed to the carrier 31, while, another surface forming the vertex of the right angle becomes perpendicular to the primary surface of the carrier 31. Accordingly, the process may adjust the attitude of the third mirror 37 such that this surface perpendicular to the primary surface of the carrier 31 makes a right angle with respect to the test beam coming from the third auto-collimator 82. After the adjustment of the attitude of the third mirror 37, the ultraviolet curable resin applied between the third mirror 37 and the carrier 31 may be cured to fix the third mirror 37 to the carrier 31.

In the process of assembling the optical de-multiplexing assembly 30, the WSF 33 is first assembled on the carrier 31. When the process first assembles the prism 32 then the WSF 33, the WSF 33 is no longer set on an exact position. Also, when the prism 32 is assembled after the second mirror 34 is set, the second mirror 34 is necessary to be adjusted after the assembly of the prism 32. Thus, the steps of assembling the optical parts, 32 to 34, are most effective in an order thereof described above.

Installing of Optical De-Multiplexing Assembly

Next, additional process of installing the optical de-multiplexing assembly 30 within the housing 20 will be described. The housing 20 is assumed, in advance to the installation of the optical de-multiplexing assembly 30, that the first and second sub-mounts, 40 and 41, the arrayed lens 38, the arrayed PD 39, the electronic circuit 42, and the support 25 are set therein. The support 25 has a cross section of a U-character with a base and a pair of walls built from the respective edges of the base, where the optical de-multiplexing assembly 30 is to be mounted on the walls of the support 25 such that the primary surface mounting the optical components, 32 to 37, faces the bottom 22 of the housing 2.

The optical de-multiplexing assembly 30 is to be installed within the housing 20 when the housing 20 does not assembly the coupling portion 10 yet. Picking the optical de-multiplexing assembly 30 and abutting the rear end of the carrier 31 where the third mirror 37 is mounted against the front surface of the bush 24 to adjust the attitude of the optical de-multiplexing assembly 30, that is, the rear edge of the carrier 31 becomes parallel to the surface of the bush 24. Then, the optical de-multiplexing assembly 30 is moved, as keeping the angle thereof against the front surface of the bush 24, to a position above the support 25 where the third mirror 37 in the optical axis thereof is aligned with the optical axis of the arrayed lens 38 and the arrayed PD 39. Then, as pushing the optical de-multiplexing assembly 30 against the support 25, the ultraviolet curable resin applied between the carrier 31 and the support 25 is cured to fix the optical de-multiplexing assembly to the support.

In the foregoing detailed description, the process of assembling the optical receiver module has been described with reference to specific embodiment thereof. However, it will be evident that various modifications and changes may be made thereto without departing from the broader spirit and scope of the present invention. The present specification and drawings are accordingly to be regarded as illustrative rather than restrictive.

What is claimed is:

1. A process of assembling an optical receiver module that receives a wavelength multiplexed signal that multiplexes optical signals attributed to wavelengths different from each other and generates electrical signals corresponding to the optical signals, the process comprising steps of:

mounting a wavelength selective filter (WSF) on a carrier, the WSF transmitting a first wavelength multiplexed signal that multiplexes a portion of the optical signals, the WSF reflecting a second wavelength multiplexed signal that multiplexes rests of the optical signals;

mounting a prism on the carrier, the prism including a first surface that reflects the wavelength multiplexed signal toward the WSF and a second surface that receives the second wavelength multiplexed signal reflected by the WSF;

mounting a mirror on the carrier, the mirror reflecting the first wavelength multiplexed signal transmitting through the WSF;

mounting a first optical de-multiplexer (o-DeMux) and a second o-DeMux on the carrier, the first o-DeMux de-multiplexing the first wavelength multiplexed signal coming from the mirror, the second o-DeMux de-multiplexing the second wavelength multiplexed signal coming from the second surface of the prism; and wherein the wavelength multiplexed signal entering the first surface of the prism has an optical axis; and wherein the step of mounting the WSF includes a step of setting an optical axis of the WSF perpendicular to the optical axis of the wavelength multiplexed signal.

2. The process according to claim 1, wherein the prism has a cross section of isosceles triangle with a vertex angle greater than a right angle, the first surface and the second surface of the prism forming the vertex angle, and wherein the step of mounting the prism carries out that the isosceles triangle in a base thereof counted to the vertex angle becomes parallel to the optical axis of the wavelength multiplexed signal.

3. The process according to claim 1,
wherein the step of mounting the mirror includes a step of setting the first wavelength multiplexed signal reflected by the mirror in an optical axis thereof becomes parallel to the optical axis of the wavelength optical signal.

4. The process according to claim 3,
wherein the step of mounting the mirror further including a step of equalizing a distance from the WSF to the first WSF to a distance from the WSF to the second WSF.

5. The process according to claim 1,
wherein the portion of the optical signals multiplexed in the first wavelength multiplexed signal have wavelengths longer than wavelengths of the rests of the optical signals multiplexed in the second wavelength multiplexed signal.

6. The process according to claim 5,
wherein the wavelength multiplexed signal multiplexes eight optical signals, and
wherein the portion of the optical signals have longer four wavelengths and the rests of the optical signals have shorter four wavelengths.

7. The process according to claim 1,
wherein the portion of the optical signals multiplexed in the first wavelength multiplexed signal have wavelengths shorter than wavelengths of the rests of the optical signals multiplexed in the second wavelength multiplexed signal.

8. The process according to claim 7,
wherein the wavelength multiplexed signal multiplexes eight optical signals, and
wherein the portion of the optical signals have shorter four wavelengths and the rests of the optical signals have longer four wavelengths.

* * * * *